No. 799,294. PATENTED SEPT. 12, 1905.
G. V. BECKMAN.
SINGLE TRACE HARNESS.
APPLICATION FILED MAY 10, 1905.
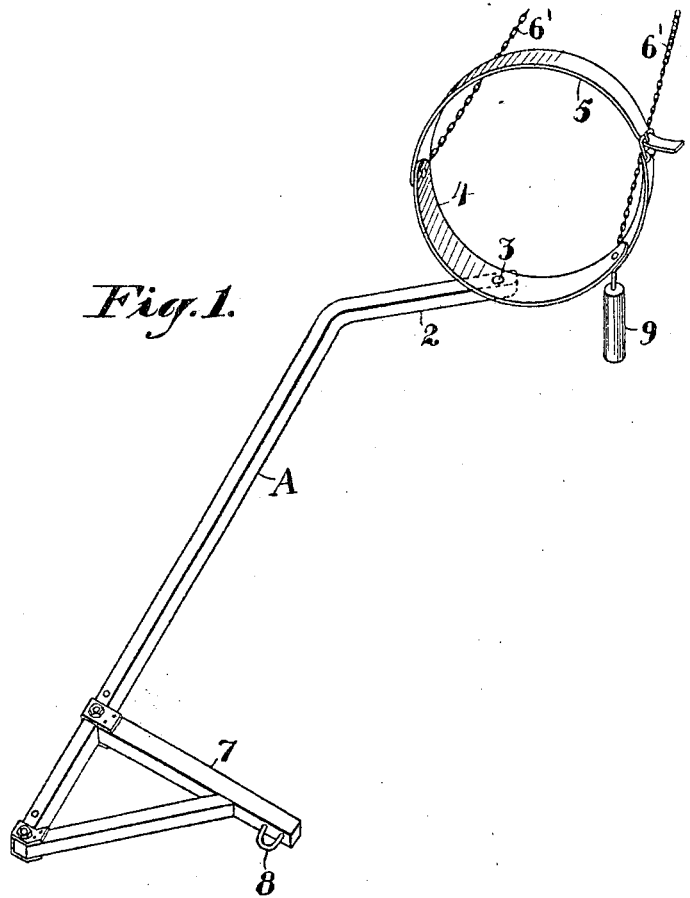
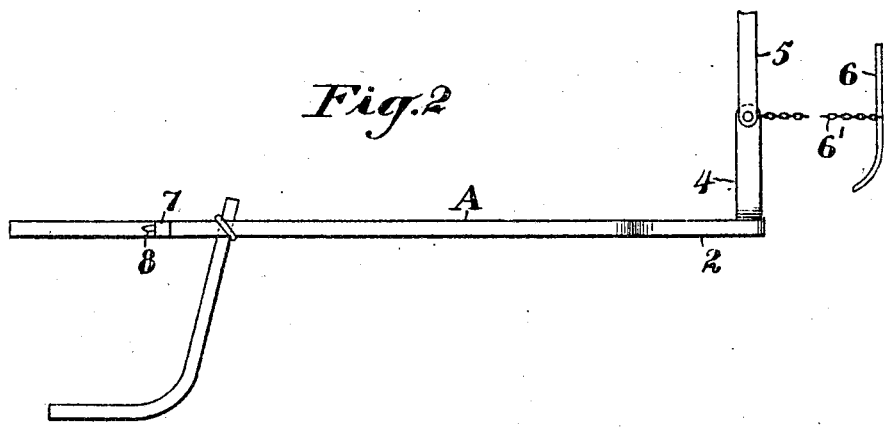
Witnesses:
F. C. Fliedner
Inventor,
George V. Beckman
By Geo. H. Strong. Atty

UNITED STATES PATENT OFFICE.

GEORGE V. BECKMAN, OF LODI, CALIFORNIA.

SINGLE-TRACE HARNESS.

No. 799,294. Specification of Letters Patent. Patented Sept. 12, 1905.

Application filed May 10, 1905. Serial No. 259,751.

*To all whom it may concern:*

Be it known that I, GEORGE V. BECKMAN, a citizen of the United States, residing at Lodi, in the county of San Joaquin and State of California, have invented new and useful Improvements in Single-Trace Harness, of which the following is a specification.

My invention relates to harness, and especially to a harness for use in plowing or cultivating in orchards, vineyards, and the like.

The object of my invention is to provide a simple practical means which will permit plowing or cultivating close up to vines and trees with no possible chance of breaking the vines or tearing the bark off of the trees, as so frequently occurs with the ordinary double-trace harness and whiffle and swingle tree arrangement.

The invention consists of the parts and the construction and combination of parts, as hereinafter more fully described and claimed, having reference to the accompanying drawings, in which—

Figure 1 is a perspective view of my improved harness. Fig. 2 is a side elevation of a slightly-modified form.

A represents a rigid trace or tug forming the essential feature of my invention. This trace, which may be made of any suitable material, such as wood or metal, is bent to one side at its front end, as shown at 2, and is attached by suitable pivotal connections, as the bolt 3, to the rigid belly-band 4. This belly-band is supported by the back-strap 5 and is connected to the hames 6 by draft-chains 6'. At the opposite end of the trace member A and at a sufficient distance from the belly-band, so as not to interfere with the proper action of the draft-animal, is an adjustable projection or bracket 7, extending in the same direction from the part A as the portion 2 and in approximately the same plane with the latter. This bracket 7 is provided with suitable means, as the eyebolt 8, for the connection of the clevis on the plow or cultivator. The shape of the part A, the length of the projections 2 and 7, and the space between the two projections are severally such that the trace will clear the animal's legs and not interfere in any way with his movements.

The bracket 7 is made adjustable to permit of the plow or cultivator being hitched up shorter or longer, as desired, and to accommodate the device to animals of different size. If desired, a counterweight, as 9, may be attached to the belly-band opposite to the side on which the trace is.

I have found that a harness of this description works to excellent advantage where it is desired to plow very close to an object or to a line of objects and that no apparent inconvenience is occasioned the draft-animal.

The trace can be attached on either side of the harness and two horses can be worked abreast with both traces on the inside and attaching to a swingletree to which the cultivator is connected, thus leaving it possible for either animal to come snug up to a vine without doing any damage.

It is possible that various changes and modifications may be made without departing from the principle of my invention, and I do not wish to be understood as limiting myself to the specific structure here shown and described. For instance, in lieu of the counterweight 9, attached to the belly-band and acting as an evener for the tug or trace, I may employ an adjustable arm 10, secured to the trace which bears on and slides over the ground and supports the trace alongside of the horse, so that the animal is relieved of all excess weight. This slide in that it holds up the trace is also an evener appliance.

Having thus described my invention, what I claim, and desire to secure by Letters Patent, is—

1. A harness consisting of a single rigid trace member adapted to extend outward from beneath the belly-band and to clear the hind legs of the animal, means for supporting the trace beneath the belly of the animal and means for connecting the trace to a plow or cultivator.

2. In a harness, a rigid trace member having means for attachment to the horse and extending along one side to the rear thereof, said trace member having a rigid projection approximate to its rear end for the attachment of the plow or cultivator.

3. In a harness, a rigid trace member having corresponding rigid lateral projections, one of said projections having means for attachment to the horse and the other having means for the attachment of the plow or cultivator.

4. A harness consisting of a rigid trace member, a rigid belly-band portion secured pivotally to one end thereof, a back-band connected to the belly-band, hames and draft connections between the hames and belly-band, means for attaching the trace to the plow or cultivator, and means for maintaining the trace out of interference with the legs of the animal.

5. In a harness, a rigid trace member having means for attachment to the horse and extending along one side and to the rear thereof, said trace member having a rigid lateral projection approximate to its rear end for the attachment of the plow or cultivator, and an evener appliance for said trace member.

In testimony whereof I have hereunto set my hand in presence of two subscribing witnesses.

GEORGE V. BECKMAN.

Witnesses:
M. WM. WHITTAKER,
WILSON H. THOMPSON.